United States Patent Office 3,556,960
Patented Jan. 19, 1971

3,556,960
ELECTROLYTIC FORMATION OF ORGANO-METALLIC COMPOUNDS
Dennis L. McKeever and Richard Waack, Midland, Mich., assignors to The Dow Chemical Company, Midland, Mich., a corporation of Delaware
No Drawing. Filed Jan. 24, 1968, Ser. No. 700,012
Int. Cl. B01k 1/00
U.S. Cl. 204—59
13 Claims

ABSTRACT OF THE DISCLOSURE

A process for the preparation of organometallic compounds comprising contacting an activated olefin or diaryl-containing hydrocarbon with an electric current in the presence of an alkali or alkaline earth metal salt electrolyte, and a tetraalkyl substituted urea, tetraalkyl substituted thiourea, tetraalkyl substituted sulfonamide or a hexaalkyl or aryl substituted phosphoramide polar solvent.

BACKGROUND OF THE INVENTION

The organometallic compounds produced by the process of this invention have been previously made by the reaction of an olefin, or other active hydrocarbon, directly with alkali metals. Said reactions, to be effective, require an alkali metal of high purity and also capable of being finely dispersed in reaction media.

Furthermore, electrolytic polymerization processes, well known in the art, appear similar to the instant invention. (Cand. J. Chem. 42, 2728 (1964); J. Poly. Sci., Part B, 3, 57 (1965)). However, the instant invention is able to produce organometallic compounds, whereas the above could not, due to the novel use in the instant invention of (1) non-polymerizable olefins and hydrocarbons, and (2) particular polar solvents which allow large electric currents to flow through the system, thus forming the desired organometallic species.

The compounds so produced are well known for their usefulness as polymerization initiators, to prepare organic intermediates, and in any reaction typical of "carbanions," i.e., to produce such substances as carboxylic acids, alcohols, etc.

SUMMARY OF THE INVENTION

The instant invention is a process for the preparation of organometallic compounds comprising contacting a non-polymerizable activated olefin or diaryl-containing hydrocarbon with one equivalent of electric current in the presence of an alkali or alkaline earth metal salt electrolyte and a particular polar solvent.

The novel use of electrolysis in this process has a number of advantages over the direct use of alkali metals: (1) the avoidance of handling highly reactive alkali metals; (2) the avoidance of strict requirements for the purity and form of the alkali metals so used; (3) better control of the reaction; and (4) avoidance of difficult separation problems in regard to the final product.

The non-polymerizable activated olefins which are suitable for the process of this invention are of two types. The first is an olefin of the formula

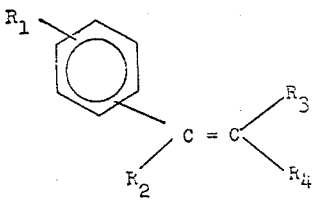

Case I wherein
$R_1$ is
 (a) H or
 (b) an inert substituent;
$R_2$ is
 (c) an unsubstituted or inertly substituted phenyl or naphthyl group or
 (d) an alkyl group of from 1 to 6 carbon atoms;
and $R_3$ and $R_4$ are each
 (e) H or
 (f) (c) or (d) above.

The second is an olefin of the formula

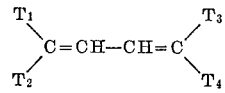

Case II wherein each of $T_1$, $T_2$, $T_3$ and $T_4$ is (c) or (d) above.

The non-polymerizable diaryl-containing hydrocarbons that are suitable for the process of this invention are those of the formula

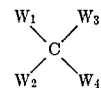

Case III wherein
$W_1$ and $W_2$ are each
 (1) an unsubstituted or inertly substituted phenyl or naphthyl group;
$W_3$ is
 (2) (1) above;
 (3) an alkyl group of from 1 to 6 carbon atoms; or
 (4) H;
and $W_4$ is
 (5) H; or, when $W_3$ is (1) above,
 (6) H, Cl, Br or I; or
 (7) (1) above.

The inert substituents mentioned above include, for example, alkyl groups of from 1 to 6 carbon atoms, such as methyl, ethyl, propyl, butyl, pentyl and hexyl.

The non-polymerizable activated olefins of Case I suitable for the process of this invention include polyaryl substituted ethylenes, such as 1,1-diphenylethylene, tetraphenylethylene, 1-naphthyl-1-phenylethylene, and 1-ethylphenyl-1,2,2-tritolylethylene; polyalkyl substituted ethylenes, such as 2-phenyl-3-ethyl-2-heptene, 4-phenyl-5-methyl-4-undecene, and 3-naphthyl-2-nonene; also, 2-phenylpropene.

The Case II olefins suitable for the process of this invention include, for example, polyaryl substituted butadienes, such as 1,1,4,4-tetraphenyl-1,3-butadiene, and 1,4-dinaphthyl-1,4-diethylphenyl - 1,3 - butadiene; polyalkyl substituted butadiene, such as 1,1,4,4-tetramethyl - 1,3-butadiene, and 1,1-diethyl-4,4-dihexyl - 1,3 - butadiene; and polyarylalkyl substituted butadienes, such as 1,1-diphenyl-4,4-diethyl-1,3-butadiene, and 1,1,4-tritolyl - 4-butyl-1,3-butadiene.

The non-polymerizable diaryl-containing hydrocarbons that are suitable for the process of this invention include, for example, polyaryl substituted methanes, such as diphenylmethane, tritolylmethane and tetraphenylmethane; polyaryl-alkyl substituted methanes, such as 1,1-diphenyl-1-naphthyl-propane and 1,1-diphenyl-1-tolyl-heptane; and, polyaryl substituted methyl halides, such as triphenylmethyl chloride, diphenyltolylmethyl chloride and tritolylmethyl iodide.

The electrolytes suitable for the process of this invention are those salts of alkali or alkaline earth metals which (1) have an anion unreactive with the organometallic product formed, and (2) have a sufficient solubility to facilitate passage of current. Preferably the initial solubility is equal to or greater than about 0.20 mole of electrolyte per 1000 ml. solvent.

It is not necessary that all the electrolyte be in solution at the start of the reaction since, if the organometallic species produced is soluble (which is desirable), the insoluble electrolyte will be drawn into solution, and the organometallic species can be prepared at concentrations much in excess of the solubility of the electrolyte. It is desirable to have a slight excess of electrolyte present with respect to the hydrocarbon starting material.

Suitable electrolytes include the halide salts of lithium, sodium, potassium, and calcium, such as LiBr, LiCl, LiI, KI, KCl, KBr, $CaBr_2$, $CaCl_2$ and $CaI_2$; also, NaBr, and NaI.

A polar solvent is desirable in order to keep the voltage requirements low. The amount of said solvent in the solution is restricted only in regard to the solubility of the electrolyte.

Suitable polar solvents include tetraalkyl ureas, such as tetramethylurea; tetraalkyl thioureas, such as tetramethylthiourea; tetraalkyl substituted sulfonamides, such as tetramethylsulfamides; and hexaalkyl or aryl substituted phosphoramides or mixtures thereof, such as hexamethylphosphoramide.

One equivalent, i.e., one Faraday, of electricity produces essentially one mole of product, and this high yield reduction process generally requires low cell voltage, dependent upon the type of equipment used. The concentration of product is directly controlled, therefore, by the amount of current passed.

The reaction is basically independent of temperature, the only limitation being that the temperature must be high enough to give solubility and fluidity to the electrolyte solution, and low enough so that the electrolytically formed reagents have thermal stability. Also, the reaction is independent of pressure, atmospheric or the autogenous pressure being suitable.

SPECIFIC EMBODIMENTS

The following specific embodiments are offered as examples of the process of the instant invention, but are in no way intended to limit same:

Example 1

The experiment was carried out in a small scale electrolytic cell.

An electrolytic solution was prepared by dissolving 2.7 grams of dry LiBr and 2.50 ml. of 1,1-diphenylethylene in 150 ml. of freshly distilled hexamethylphosphoramide (HMPA). This mixture was then transferred to the electrolytic cell and 0.0143 Faraday (30 volts at 100 mamps.) of current passed. 0.0113 mole of an active organometallic species was formed in the cathode compartment. Analysis showed the species to be 1,1,4,4-tetraphenyl-1,4-dilithiobutane.

One ml. of the product solution was used to polymerize 10 grams of styrene in 100 ml. of benzene. The reaction, initiated at room temperature, was rapid and exothermic. The resulting polymerization was terminated with methanol, and the product was found to have a molecular weight of 520,000.

Example 2

The equipment and procedure were the same as used in Example 1. An electrolyte solution was prepared by dissolving 0.61 gram of NaI ($CaI_2$ is suitable) and 0.028 gram of tetraphenylethylene in 20 ml. of freshly distilled HMPA. A current was passed through this solution in the usual way, and the active organometallic species which formed at the cathode was spectroscopically characterized. Initially a violet-colored radical anion formed, but finally, red-colored tetraphenyldisodioethylene formed. The visible spectral characteristics of the two species were consistent with those reported by J. F. Garst and E. R. Zabolotny, J. Am. Chem. Soc. 87, 495 (1965).

Example 3

The equipment and procedure were the same as used in the previous examples. An electrolytic solution was prepared by dissolving 0.62 gram of NaI and 0.039 gram of triphenylmethyl chloride in 20 ml. of freshly distilled HMPA. Current was passed through this solution in the usual way, and the active organometallic species (triphenylmethylsodium) which formed at the cathode was spectroscopically characterized, the features of the resulting red-colored carbanion being in complete accord with those reported by S. Boileau and P. Sitwalt, Compt. Rend., Ser. C 262 1165 (1966).

Example 4

The equipment and procedure were the same as used in previous examples. An electrolyte solution was prepared by dissolving 2.61 grams of LiBr and 2.0 ml. of 1,1-diphenylethylene in 150 ml. of freshly distilled tetramethylurea. Current was passed through this solution in the usual way and an active amber-colored organometallic species formed at the cathode.

Example 5

The equipment and procedure were the same as used in previous examples. An electrolyte solution was prepared by dissolving 2.61 grams LiBr and 2.0 ml. of 1,1,4,4-tetramethyl-1,3-butadiene in 150 ml. of freshly distilled HMPA. Current was passed through this solution in the usual way and an active red brown-colored organometallic species formed at the cathode.

We claim:

1. A process for the preparation of organometallic compounds which comprises passing an electric current through a solution in a liquid polar solvent of (1) an electrolyte consisting essentially of a salt of an alkali or alkaline earth metal, said salt being at least partially soluble in the solvent, the anion of said salt being unreactive with the organometallic product formed; and (2) one of the following compounds:

(A) an activated olefin of the formula

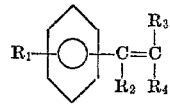

wherein
$R_1$ is
  (a) H; or
  (b) an alkyl group of from 1 to 6 carbon atoms;
$R_2$ is
  (c) an unsubstituted or inertly substituted phenyl or naphthyl group, said inert substituent being an alkyl group of from 1 to 6 carbon atoms; or
  (d) an alkyl group of from 1 to 6 carbon atoms;
and $R_3$ and $R_4$ are each
  (e) H; or
  (f) one of (c) or (d) above;

(B) an activated olefin of the formula

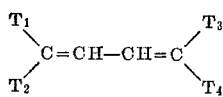

wherein $T_1$, $T_2$, $T_3$ and $T_4$ are each (c) or (d) above, and (C) a hydrocarbon of the formula

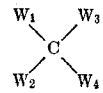

wherein
W₁ and W₂ are each (c) above;
W₃ is H, or (b) or (c) above; and
W₄ is
  (g) H;
  (h) (c) above; or, when W₃ is (c) above,
  (i) H, Cl, Br or I;
the solvent consisting essentially of a tetraalkyl urea or tetraalkyl thiourea, a tetraalkyl sulfamide, or a hexaalkyl phosphoramide.

2. The process of claim 1 wherein the olefin is a polyaryl substituted ethylene of Formula (A)(I).

3. The process of claim 2 wherein the olefin is 1,1-diphenylethylene.

4. The process of claim 2 wherein the olefin is tetraphenylethylene.

5. The process of claim 1 wherein the hydrocarbon is a polyaryl substituted methyl halide of Formula B.

6. The process of calim 5 wherein the hydrocarbon is triphenylmethyl chloride.

7. The process of claim 1 wherein the electrolyte is a Li halide.

8. The process of claim 7 wherein the electrolyte is LiBr.

9. The process of claim 1 wherein the electrolyte is a Na halide.

10. The process of claim 9 wherein the electrolyte is NaI.

11. The process of claim 1 wherein the polar solvent is a hexaalkyl phosphoramide.

12. The process of claim 11 wherein the polar solvent is hexamethylphosphoramide.

13. The process of claim 1 wherein the solubility of the electrolyte is equal to or greater than 0.20 mole per 1000 ml. of polar solvent.

References Cited
UNITED STATES PATENTS

| | | | |
|---|---|---|---|
| 3,171,848 | 3/1965 | Kobetz | 204—59X |
| 3,197,392 | 7/1965 | Silversmith et al. | 204—59X |
| 3,271,278 | 9/1966 | Baizer | 204—72 |

PATRICK P. GARVIN, Primary Examiner

W. H. CANNON, Assistant Examiner

U.S. Cl. X.R.

204—72